(12) United States Patent
Peng et al.

(10) Patent No.: US 9,794,101 B2
(45) Date of Patent: Oct. 17, 2017

(54) METHOD, DEVICE AND SYSTEM FOR TRANSMITTING SOUNDING REFERENCE SIGNALS

(75) Inventors: Ying Peng, Beijing (CN); Qiubin Gao, Beijing (CN); Dingcheng Yang, Beijing (CN); Deshan Miao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 806 days.

(21) Appl. No.: 13/382,929

(22) PCT Filed: Jul. 30, 2010

(86) PCT No.: PCT/CN2010/075592
§ 371 (c)(1),
(2), (4) Date: Jan. 8, 2012

(87) PCT Pub. No.: WO2011/012087
PCT Pub. Date: Feb. 3, 2011

(65) Prior Publication Data
US 2012/0129561 A1 May 24, 2012

(30) Foreign Application Priority Data

Jul. 30, 2009 (CN) .......................... 2009 1 0090014

(51) Int. Cl.
*H04W 72/08* (2009.01)
*H04W 4/00* (2009.01)
*H04L 27/26* (2006.01)
*H04W 72/04* (2009.01)
*H04L 5/00* (2006.01)

(52) U.S. Cl.
CPC ........ *H04L 27/2613* (2013.01); *H04L 5/0035* (2013.01); *H04L 5/0051* (2013.01); *H04L 5/0007* (2013.01); *H04W 72/0413* (2013.01)

(58) Field of Classification Search
CPC . H04W 72/0413; H04W 16/12; H04W 28/26; H04W 52/322; H04W 52/325; H04W 52/54; H04W 72/0406
See application file for complete search history.

(56) References Cited

U.S. PATENT DOCUMENTS

2008/0267119 A1   10/2008 Kowalski
2011/0275397 A1*  11/2011 Guey .................... H04W 16/12
                                                  455/509
2012/0051265 A1*   3/2012 Shen ..................... H04L 5/0035
                                                  370/254

FOREIGN PATENT DOCUMENTS

CN    101384055 A    3/2009
CN    101442808 A    5/2009
(Continued)

OTHER PUBLICATIONS

International Search Report issued International Application No. PCT/CN2010/075592, dated Nov. 11, 2010.
(Continued)

*Primary Examiner* — Bobbak Safaipour
(74) *Attorney, Agent, or Firm* — Handal & Morofsky, LLC

(57) ABSTRACT

The embodiments of the present invention disclose a method, device and system for transmitting Sounding Reference Signals (SRSs). The method includes the following steps: a user equipment receives the special SRS sequence information for Coordinated Multi-Point Operation (CoMP) from a base station equipment, and the base station equipment corresponds to a cell in a CoMP SRS cluster (101); the user equipment transmits an SRS to the cell in the CoMP SRS cluster based on the special SRS sequence information for CoMP (102). The embodiments of the present invention ensure the accuracy and reliability of channel estimation.

27 Claims, 8 Drawing Sheets

(56) References Cited

FOREIGN PATENT DOCUMENTS

| EP | 2424285 A1 | 2/2012 |
| EP | 2382806 B1 | 11/2012 |
| JP | 2009004926 | 8/2009 |
| KR | 20080085653 A | 9/2008 |
| KR | 20080112115 A | 12/2008 |
| WO | 2009023692 A2 | 2/2009 |
| WO | 2010085190 A1 | 7/2010 |
| WO | 2016105667 A1 | 9/2010 |

OTHER PUBLICATIONS

Search Report issued in European Patent Application No. 10803920.7, dated May 16, 2017.
Office Action issued in Chinese patent application No. 200910090014.6, dated Dec. 25, 2012 (in Chinese).
Office Action issued in Chinese patent application No. 200910090014.6, dated Dec. 25, 2012 (in English).
Notification of Reasons for Refusal issued in Japanese patent application No. 2012-521951, dated Oct. 30, 2013 (in Japanese).
Office Action issued in Korean patent application No. 10-2011-7030047, dated Aug. 8, 2013.
Office Action issued in Korean patent application No. 10-2011-7030047, dated Jul. 8, 2013 (In Korean).
Office Action issued in Korean patent application No. 10-2011-7030047, dated Jul. 8, 2013 (In English).
Notification of Reasons for Refusal issued in Japanese patent application No. 2012-521951, dated Oct. 30, 2013 (In English).
3GPP TSG RAN WG1 meeting #57bis, R1-092776-Analysis of SRS scheme for CoMP, Jun. 29-Jul. 3, 2009.

* cited by examiner

METHOD, DEVICE AND SYSTEM FOR TRANSMITTING SOUNDING REFERENCE SIGNALS

The present application claims the priority of the Chinese patent application with the application date of Jul. 30, 2009, the application number of 200910090014.6, and the patent name of "method, device and system for transmitting sounding reference signals", and all content of the priority application is combined into the present application quoting.

FIELD OF THE PRESENT INVENTION

The present invention relates generally to the field of mobile communication technology, and more particularly to method, device and system for transmitting sounding reference signals.

BACKGROUND OF THE PRESENT INVENTION

At present, International Telecommunication Union (ITU) proposes very stringent requirements to the next generation mobile communication system—International Mobile Telecommunications-Advanced (IMT-Advanced), for example, the maximum system bandwidth needs to reach 100 MHz and peak rate of uplink and downlink data transmission respectively need to reach 1 Gbps and 500 Mbps. Also, it proposes very high requirements to cell spectral efficiency of system, especially to edge spectral efficiency.

In order to meet the requirements of IMT-Advanced system, 3rd Generation Partnership Project (3GPP) proposes Coordinated Multi-Point Operation (CoMP) technology to improve system performance in its next generation mobile cellular communication system, i.e. Long Term Evolution Advanced (LTE-Advanced).

Coordinated Multi-Point Operation (CoMP) technology is the cooperation among multiple transmission points which are geographically separated from each other. CoMP technology includes downlink coordinated transmission and uplink joint reception, while downlink coordinated transmission includes coordinated scheduling solution and coordinated transmission solution. Therein, in the coordinated scheduling solution, with coordination of time, frequency and space resources between cells, base station allocates mutually orthogonal resources to different user equipments (UE), to avoid the interference between them, reduce the interference between cells, and thereby improve edge performance; in the coordination transmission solution, multiple cells transmit data to one UE on the same time/frequency resources, to strengthen the signal received by UE, that could improve the quality of the signal received by UE according to the superposition of useful signals from the multiple cells, also reduce interference suffered by UE, and thereby improve system performance; uplink joint reception means that multiple cells receive data from one UE so that joint reception can be done at the base station to improve demodulation quality of data.

In the existing LTE system, UE sends uplink Sounding Reference Signals (SRS) to evolved Node-B (eNodeB) on time/frequency resources assigned by its serving cell, the eNodeB estimates the channel state information (CSI) between the UE and the eNodeB according to received SRS, and applies the estimated CSI for uplink frequency scheduling, Modulation and Coding Scheme (MCS) choosing and resources allocation. To Time Division Duplex (TDD) system, eNodeB also could calculate weighted vector of downlink beamforming according to the achieved uplink channel state information.

In the process of implementing the present invention, the inventor discovers that the existing technology has at least the following problems:

In the existing LTE system, the unit of SRS resource allocation is assigned by its serving cell, eNodeB allocates mutually orthogonal resources to different UEs intra-cell, while SRS of neighboring cells could be allocated in different sub-frames for transmission. At the same time, SRS base sequence is bound to the cell ID of the serving cell, that is to say, the eNodeB and the UE could get the base sequence in case that the eNodeB and the UE all get the serving cell ID. But in LTE-Advanced system, when CoMP SRS base sequence used in CoMP SRS cluster is not bound to the serving cell ID, the UE could not get the SRS sequence information.

SUMMARY OF THE PRESENT INVENTION

The embodiment of the present invention provides a method, device and system for transmitting sounding reference signals, to ensure the accuracy of channel estimation.

The embodiment of the present invention provides a method for transmitting SRS, comprising:

a user equipment receiving the special SRS sequence information for Coordinated Multi-Point Operation (CoMP) from a base station equipment, said base station equipment corresponding to cells in a CoMP SRS cluster;

said user equipment transmitting an SRS to the cells in the CoMP SRS cluster according to said special SRS sequence information.

The embodiment of the present invention also provides a user equipment, comprising:

receiving module, is used for receiving the special SRS sequence information for CoMP from a base station equipment, said base station equipment corresponding to cells in a CoMP SRS cluster;

transmitting module, is used for transmitting an SRS to the cells in the CoMP SRS cluster according to the special SRS sequence information for CoMP received by the receiving module.

The embodiment of the present invention also provides a base station equipment, comprising:

obtaining module, is used for obtaining the special SRS sequence information for CoMP corresponding to cells in a CoMP SRS cluster;

transmitting module, is used for transmitting the special SRS sequence information for CoMP obtained by said obtaining module to user equipment, to let said user equipment transmit SRS according to said special SRS sequence information for CoMP.

The embodiment of the present invention also provides a system for transmitting SRS, comprising user equipment and base station equipment, said user equipment, is used for receiving the special SRS sequence information for CoMP from said base station equipment, transmitting an SRS to the cells in the CoMP SRS cluster according to said special SRS sequence information, said base station equipment corresponding to cells in a CoMP SRS cluster;

said base station equipment, is used for obtaining the special SRS sequence information for CoMP corresponding to cells in a CoMP SRS cluster, transmitting the special SRS sequence information for CoMP to said user equipment, to let said user equipment transmit SRS according to said special SRS sequence information for CoMP.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

DETAILED DESCRIPTION OF THE EMBODIMENTS OF THE PRESENT INVENTION

In the technology solution provided by the embodiment of the present invention, when CoMP SRS base sequence is bound to ID of a serving cell in CoMP SRS cluster, UEs in that serving cell use the same SRS base sequence notification manner and notification form as that used in the existing LTE system, and other serving cells use difference SRS base sequence notification manner and notification form from that used in the existing LTE system; when CoMP SRS base sequence is individually selected, that is not bound to any serving cell in CoMP SRS cluster, any cell in CoMP SRS cluster needs to use difference SRS base sequence notification manner and notification form from that in the existing LTE system. Therein, individually selected CoMP SRS base sequence is different from sequence group used in any cell included in CoMP SRS cluster, it could be arbitrarily chosen, and should generate less interference to sequences used in cells in CoMP SRS cluster. In the embodiment of the present invention, the SRS base sequence notification manner could be RRC signaling notification, downlink control signaling notification or broadcast notification, the SRS base sequence notification form could comprising noticing group ID of special SRS sequence for CoMP or the base sequence, or setting cluster of special SRS sequences for CoMP and noticing number of SRS sequence in the set cluster.

Embodiment of this invention will be clearly and completely described with pictures in the following. Apparently, the following embodiment is only a part of this invention, but not the whole invention. All the embodiments achieved by general technical personnel in this field based on this application without creative work belong to the protection scope of the present application.

Figure 1:
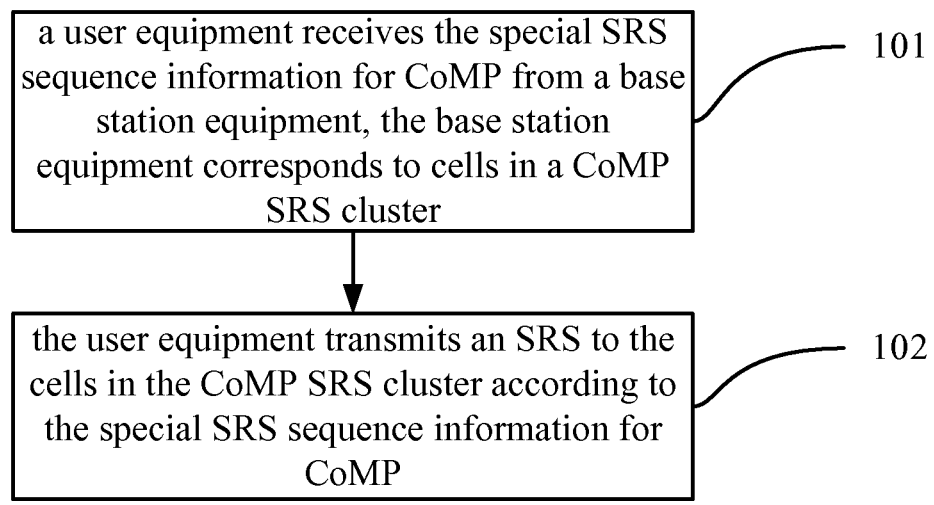
FIG. 1 is a flow diagram of a method for transmitting SRS in embodiment 1 of the present invention.

FIG. 1 is a flow diagram of a method for transmitting SRS in embodiment 1 of the present invention, comprising the following steps:

Step 101, a user equipment receives the special SRS sequence information for CoMP from a base station equipment, the base station equipment corresponds to cells in a CoMP SRS cluster.

Therein, CoMP SRS cluster is a cell-cluster for implementing CoMP, and special SRS sequence information for CoMP is used to indicate the CoMP SRS base sequence which the base station equipment corresponding to cells in CoMP SRS cluster chooses for the CoMP SRS cluster. Special SRS sequence information for CoMP could be sequence group number and base sequence number corresponding to CoMP SRS base sequence, could be CoMP SRS base sequence, could be number of CoMP SRS base sequence in CoMP SRS cluster, could be group ID of CoMP SRS cluster, could be number of group ID of CoMP SRS cluster, also could be group ID and sequence ID, still could be number of group ID and sequence ID. The above-mentioned special SRS sequence information for CoMP could be bound to SRS sequence of one cell in the CoMP SRS cluster, or not bound to any SRS sequence of any cell in the CoMP SRS cluster, so as to maintain less interference to sequence group used in cells in CoMP SRS cluster.

Moreover, special SRS sequence information for CoMP could also comprise cyclic shift value, which could be from cluster same as or different from that used in the existing LTE system. Different cyclic shift value clusters should be configured for different CoMP SRS clusters according to the requirement.

Specifically, cells in CoMP SRS cluster could transmit special SRS sequence information for CoMP to UE by RRC signaling, downlink control signaling or broadcast notification. The cell which transmits special SRS sequence information for CoMP to UE could be the serving cell of the UE, or other cells of the UE.

Step 102, the user equipment transmits an SRS to the cells in the CoMP SRS cluster according to the special SRS sequence information for CoMP.

Specifically, the user equipment could obtain corresponding CoMP SRS base sequence according to the received special SRS sequence information for CoMP, and use the base sequence, the cyclic shift value and SRS configuration information to transmit SRS on the time/frequency resources scheduled by base station equipment. The said SRS configuration information comprises bandwidth, periodicity and other information.

For the following SRS transmission, the user equipment could use the special SRS sequence information for CoMP to transmit SRS, or reconfigure special SRS sequence information for CoMP, or implement sequence hopping according to specific predefined hopping manner of SRS.

It should be explained that, the embodiment of the present invention only takes the SRS transmission manner based on Code Division Multiplexing (CDM) as an example to describe SRS transmission method. The technology solution provided in the embodiment of the present invention is also applicable in other SRS transmission manners, comprising but not limited to the SRS transmission manner based on Frequency Division Multiplexing (FDM), FDM/CDM and etc.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 2:
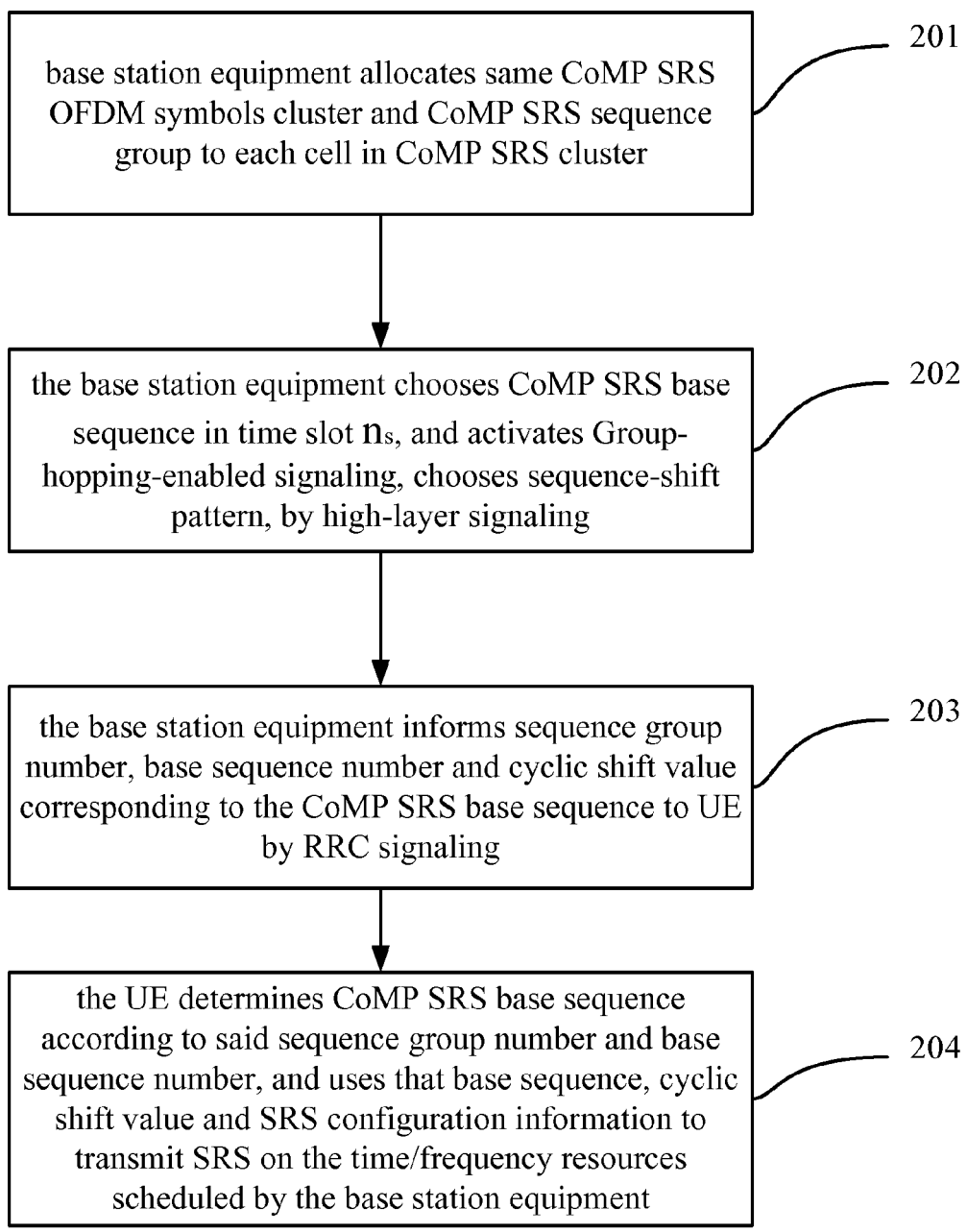
FIG. 2 is a flow diagram of a method for transmitting SRS in embodiment 2 of the present invention.

FIG. 2 is a flow diagram of a method for transmitting SRS in embodiment 2 of the present invention, comprising the following steps:

Therein, CoMP SRS sequence group is different from the base sequence of any cell in the CoMP SRS cluster, or is the same as base sequence of one cell in the CoMP SRS cluster.

Step 202, the base station equipment chooses CoMP SRS base sequence in time slot $n_s$, and activates Group-hopping-enabled signaling, chooses sequence-shift pattern, by high-layer signaling.

Specifically, the base station equipment could use the following formula to choose sequence-shift pattern:

$$f_{ss}^{CoMP} = N_{ID}^{CoMP} \bmod 30$$

Therein, $f_{ss}^{CoMP}$ is special sequence-shift pattern for CoMP; $N_{ID}^{CoMP}$ is identification of CoMP SRS cluster, that is group ID of CoMP SRS cluster.

Moreover, the sequence-shift pattern chosen in this step is different from the sequence-shift pattern of PUSCH (Physical Uplink Shared Channel), $f_{ss}^{PUSCH} = (f_{ss}^{PUCCH} + \Delta_{ss}) \bmod 30$, $\Delta_{ss} \in \{0, 1, \ldots, 29\}$, and the sequence-shift pattern of PUSCH could be obtained by high-layer configuration or predetermined calculation manner.

Step 203, the base station equipment informs sequence group number, base sequence number and cyclic shift value corresponding to the CoMP SRS base sequence to UE by RRC signaling.

Specifically, sequence group number and base sequence number could be respectively calculated by the following formula:

$$u = (f_{gh}(n_s) + f_{ss}^{CoMP}) \bmod 30;$$

$$v = \begin{cases} c(n_s) \\ 0 \end{cases}, c_{init} = \left\lfloor \frac{N_{ID}^{CoMP}}{30} \right\rfloor \cdot 2^5 + f_{ss}^{PUSCH}$$

Therein, u is the sequence group number; $f_{gh}(n_s)$ is the group hopping pattern; $f_{ss}^{CoMP}$ is the sequence-shift pattern for CoMP;

v is the base sequence number; c(i) is pseudo-random sequence; $c_{init}$ is initial value; $f_{ss}^{PUSCH}$ is the sequence-shift pattern; $N_{ID}^{CoMP}$ is identification of the CoMP SRS cluster, that is the group ID of the CoMP SRS cluster.

Cyclic shift value could be configured by high-layer to each user, and cyclic shift value cluster could be same as that used in the existing LTE system, that is {0, 1, 2, 3, 4, 5, 6, 7}. Considering the interference problem, the amount of cyclic shift values could be reduced in the case that the resources quantity is sufficient, such as {0, 2, 4, 6}, {1, 3, 5, 7}, etc. Different cyclic shift value cluster could be configured in different CoMP SRS cluster according to the requirement.

The base station equipment also could transmit the above-mentioned information to UE by downlink control signaling notification or broadcast notification.

Step 204, the UE determines CoMP SRS base sequence according to said sequence group number and base sequence number, and uses that base sequence, cyclic shift value and SRS configuration information to transmit SRS on the time/frequency resources scheduled by the base station equipment.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 3:
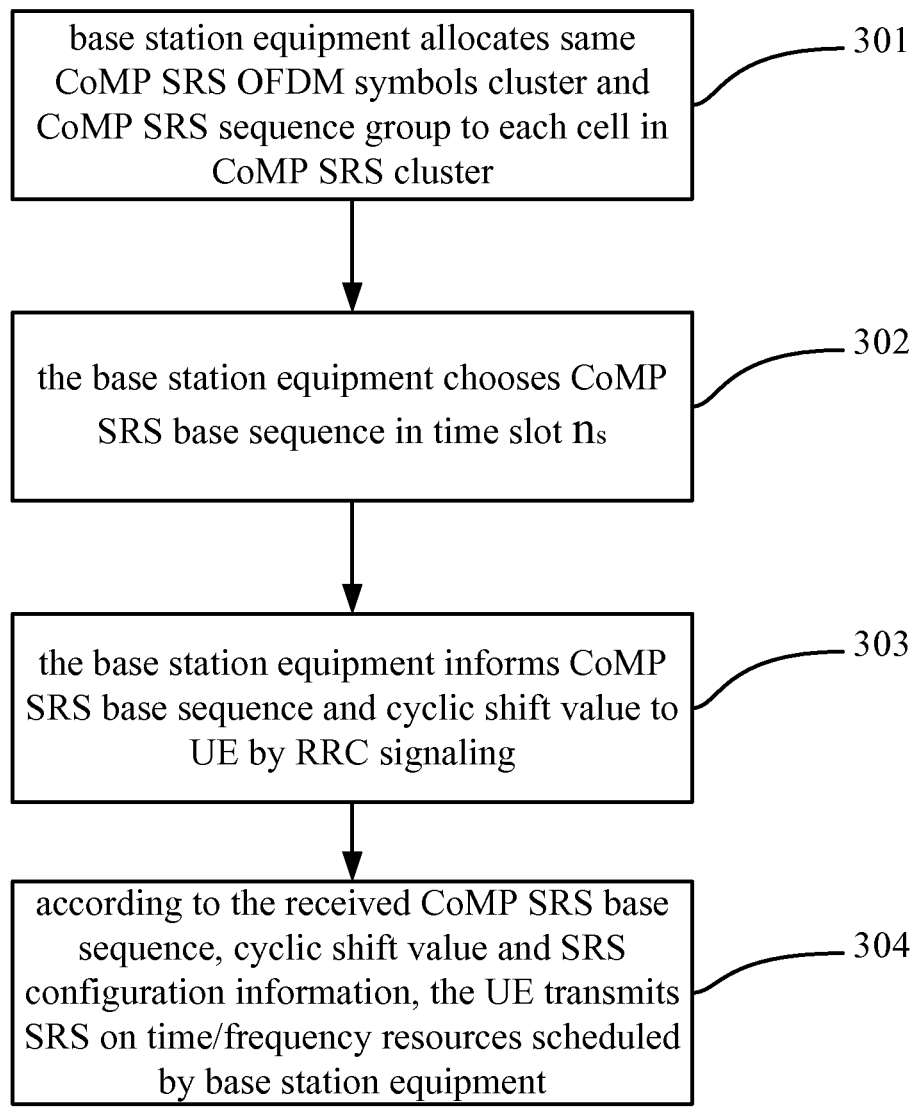
FIG. 3 is a flow diagram of a method for transmitting SRS in embodiment 3 of the present invention.

FIG. 3 is a flow diagram of a method for transmitting SRS in embodiment 3 of the present invention, comprising the following steps:

Step 301, base station equipment allocates same CoMP SRS OFDM symbols cluster and CoMP SRS sequence group to each cell in CoMP SRS cluster.

Therein, CoMP SRS sequence group is different from the base sequence of any cell in the CoMP SRS cluster, or is the same as base sequence of one cell in the CoMP SRS cluster.

Step 302, the base station equipment chooses CoMP SRS base sequence in time slot $n_s$.

Step 303, the base station equipment informs CoMP SRS base sequence and cyclic shift value to UE by RRC signaling.

Therein, cyclic shift value could be configured by high-layer to each user, and cyclic shift value cluster could be same as that used in the existing LTE system, that is {0, 1, 2, 3, 4, 5, 6, 7}. Considering the interference problem, the amount of cyclic shift values could be reduced in the case that the resources quantity is sufficient, such as {0, 2, 4, 6}, {1, 3, 5, 7}, etc. Different cyclic shift value cluster could be configured in different CoMP SRS cluster according to the requirement.

The base station equipment also could transmit the above-mentioned information to UE by downlink control signaling notification or broadcast notification.

Step 304, according to the received CoMP SRS base sequence, cyclic shift value and SRS configuration information, the UE transmits SRS on time/frequency resources scheduled by base station equipment.

In addition, for the following SRS transmission, the UE could use the SRS base sequence same as that used in the last SRS transmission, or could reconfigure SRS base sequence, or could implement sequence frequency hopping according to predefined frequency hopping manner of SRS.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 4:
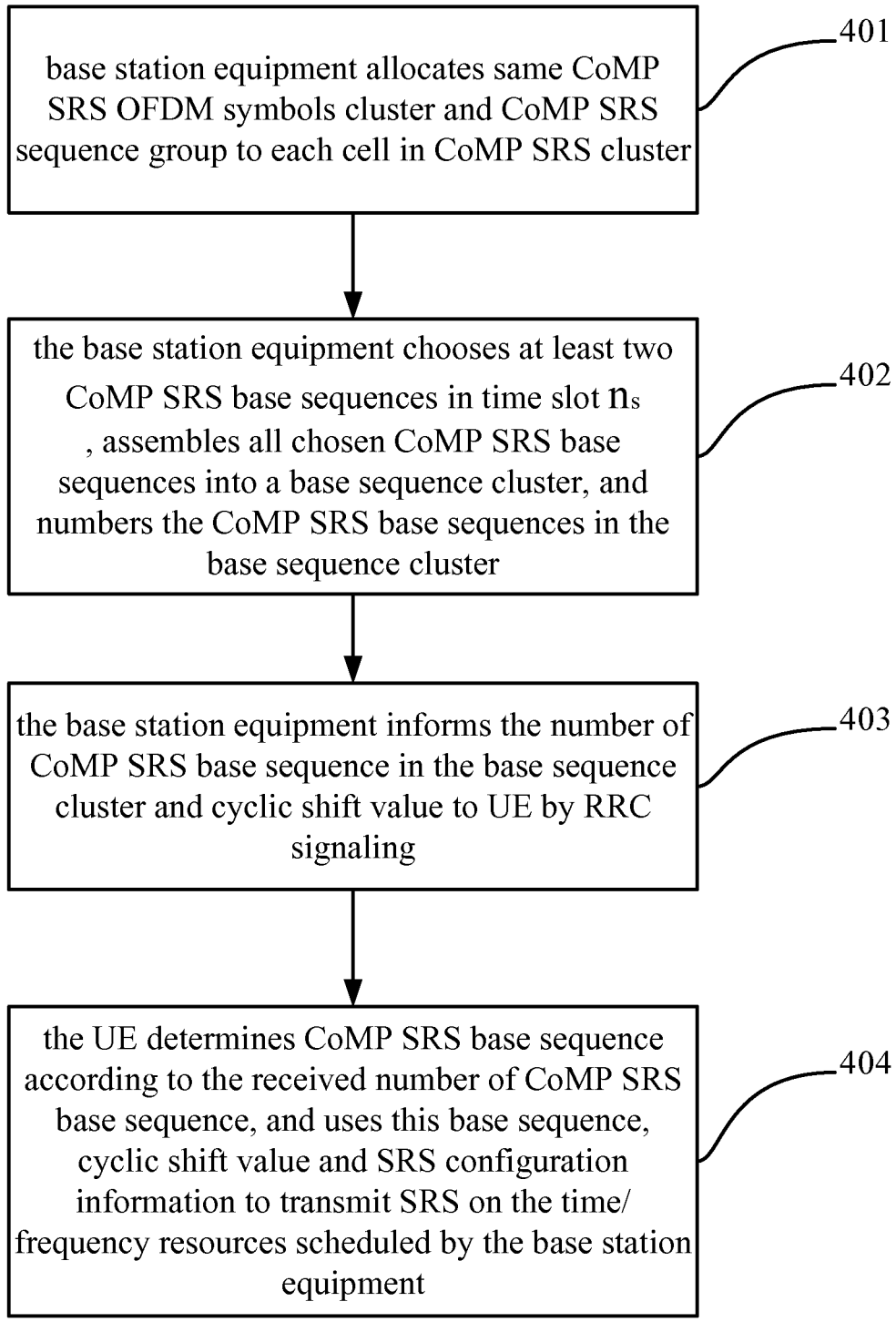
FIG. 4 is a flow diagram of a method for transmitting SRS in embodiment 4 of the present invention.

FIG. 4 is a flow diagram of a method for transmitting SRS in embodiment 4 of the present invention, comprising the following steps:

Step 401, base station equipment allocates same CoMP SRS OFDM symbols cluster and CoMP SRS sequence group to each cell in CoMP SRS cluster.

Therein, CoMP SRS sequence group is different from the base sequence of any cell in the CoMP SRS cluster, or is the same as base sequence of one cell in the CoMP SRS cluster.

Step 402, the base station equipment chooses at least two CoMP SRS base sequences in time slot $n_s$, assembles all chosen CoMP SRS base sequences into a base sequence cluster, and numbers the CoMP SRS base sequences in the base sequence cluster.

Step 403, the base station equipment informs the number of CoMP SRS base sequence in the base sequence cluster and cyclic shift value to UE by RRC signaling.

Therein, cyclic shift value could be configured by high-layer to each user, and cyclic shift value cluster could be same as that used in the existing LTE system, that is {0, 1, 2, 3, 4, 5, 6, 7}. Considering the interference problem, the amount of cyclic shift values could be reduced in the case that the resources quantity is sufficient, such as {0, 2, 4, 6}, {1, 3, 5, 7}, etc. Different cyclic shift value cluster could be configured in different CoMP SRS cluster according to the requirement.

The base station equipment also could transmit the above-mentioned information to UE by downlink control signaling notification or broadcast notification.

Step 404, the UE determines CoMP SRS base sequence according to the received number of CoMP SRS base sequence, and uses this base sequence, cyclic shift value and SRS configuration information to transmit SRS on the time/frequency resources scheduled by the base station equipment.

In addition, for the following SRS transmission, the UE could use the SRS base sequence same as that used in the last SRS transmission, or could reconfigure SRS base sequence, or could implement sequence frequency hopping according to predefined frequency hopping manner of SRS.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 5:
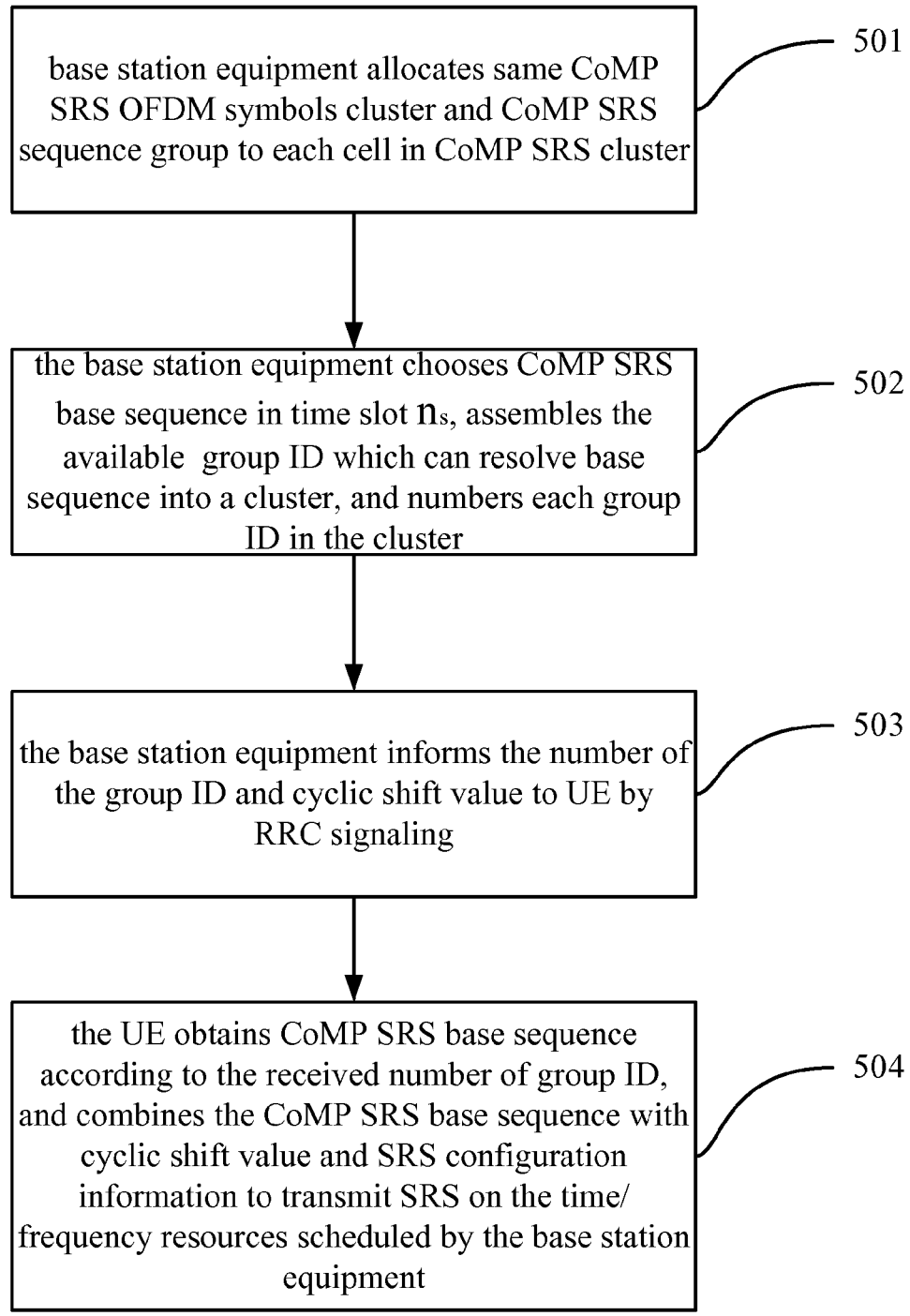
FIG. 5 is a flow diagram of a method for transmitting SRS in embodiment 5 of the present invention.

FIG. 5 is a flow diagram of a method for transmitting SRS in embodiment 5 of the present invention, comprising the following steps:

Step 501, base station equipment allocates same CoMP SRS OFDM symbols cluster and CoMP SRS sequence group to each cell in CoMP SRS cluster.

Therein, CoMP SRS sequence group is different from the base sequence of any cell in the CoMP SRS cluster, or is the same as base sequence of one cell in the CoMP SRS cluster.

Step 502, the base station equipment chooses CoMP SRS base sequence in time slot $n_s$, assembles the available $N_{ID}^{CoMP}$ (group ID) which can resolve base sequence into a cluster, and numbers each group ID in the cluster.

Step 503, the base station equipment informs the number of the group ID and cyclic shift value to UE by RRC signaling.

At the same time, the base station equipment could also inform the available $N_{ID}^{CoMP}$ cluster or cluster number in time slot $n_s$ to the UE.

Therein, cyclic shift value could be configured by high-layer to each user, and cyclic shift value cluster could be same as that used in the existing LTE system, that is {0, 1, 2, 3, 4, 5, 6, 7}. Considering the interference problem, the amount of cyclic shift values could be reduced in the case that the resources quantity is sufficient, such as {0, 2, 4, 6}, {1, 3, 5, 7}, etc. Different cyclic shift value cluster could be configured in different CoMP SRS cluster according to the requirement.

The base station equipment also could transmit the above-mentioned information to UE by downlink control signaling notification or broadcast notification.

Step 504, the UE obtains CoMP SRS base sequence according to the received number of group ID, and combines the CoMP SRS base sequence with cyclic shift value and SRS configuration information to transmit SRS on the time/frequency resources scheduled by the base station equipment.

In addition, for the following SRS transmission, the UE could use the SRS base sequence same as that used in the last SRS transmission, or could reconfigure SRS base sequence, or could implement sequence frequency hopping according to predefined frequency hopping manner of SRS.

Moreover, the base station equipment also could choose CoMP SRS base sequence, determine the group ID which can resolve this base sequence, and transmit the group ID to the UE, while the UE determines corresponding CoMP SRS base sequence according to this group ID, and uses this base sequence, cyclic shift value and SRS configuration information to transmit SRS.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 6:
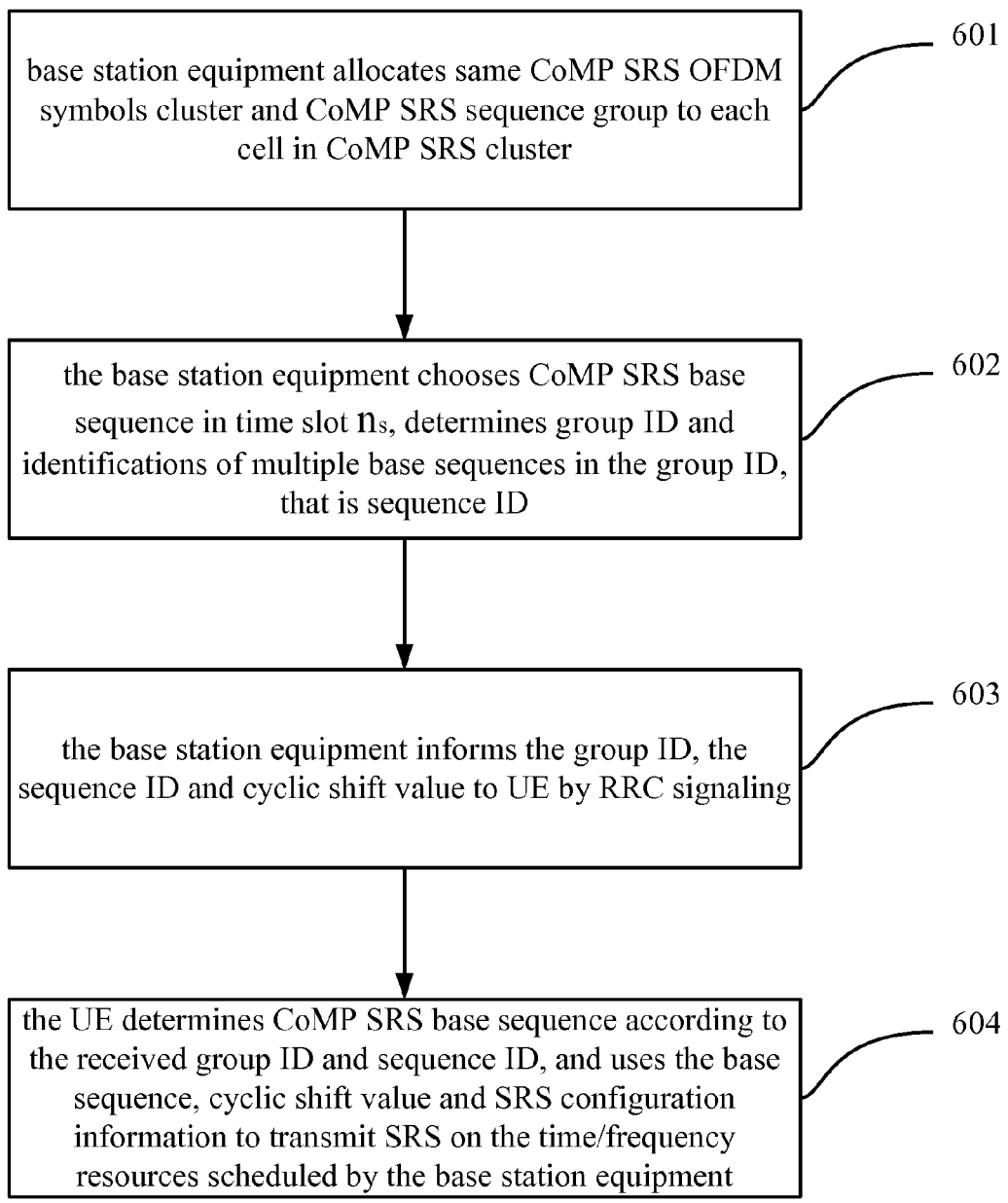
FIG. 6 is a flow diagram of a method for transmitting SRS in embodiment 6 of the present invention.

FIG. 6 is a flow diagram of a method for transmitting SRS in embodiment 6 of the present invention, comprising the following steps:

Step 601, base station equipment allocates same CoMP SRS OFDM symbols cluster and CoMP SRS sequence group to each cell in CoMP SRS cluster.

Therein, CoMP SRS sequence group is different from the base sequence of any cell in the CoMP SRS cluster, or is the same as base sequence of one cell in the CoMP SRS cluster.

Step 602, the base station equipment chooses CoMP SRS base sequence in time slot $n_s$, determines $N_{ID}^{CoMP}$ and identifications of multiple base sequences in the $N_{ID}^{CoMP}$, that is sequence ID.

Step 603, the base station equipment informs the group ID, the sequence ID and cyclic shift value to UE by RRC signaling.

Therein, cyclic shift value could be configured by high-layer to each user, and cyclic shift value cluster could be same as that used in the existing LTE system, that is {0, 1, 2, 3, 4, 5, 6, 7}. Considering the interference problem, the amount of cyclic shift values could be reduced in the case that the resources quantity is sufficient, such as {0, 2, 4, 6}, {1, 3, 5, 7}, etc. Different cyclic shift value cluster could be configured in different CoMP SRS cluster according to the requirement.

The base station equipment also could transmit the above-mentioned information to UE by downlink control signaling notification or broadcast notification.

Step 604, the UE determines CoMP SRS base sequence according to the received group ID and sequence ID, and uses the base sequence, cyclic shift value and SRS configuration information to transmit SRS on the time/frequency resources scheduled by the base station equipment.

In addition, for the following SRS transmission, the UE could use the SRS base sequence same as that used in the last SRS transmission, or could reconfigure SRS base sequence, or could implement sequence frequency hopping according to predefined frequency hopping manner of SRS.

Moreover, the base station equipment also could choose CoMP SRS base sequence, determine group ID and the number of sequence ID which can resolve this base sequence, and transmit the group ID and the number of sequence ID to the UE, while, the UE determines corresponding CoMP SRS base sequence according to this group ID and number of sequence ID, and uses this base sequence, cyclic shift value and SRS configuration information to transmit SRS.

It should be explained that, in the method of the present invention, the order of the steps could be adjusted according to actual requirement.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 7:
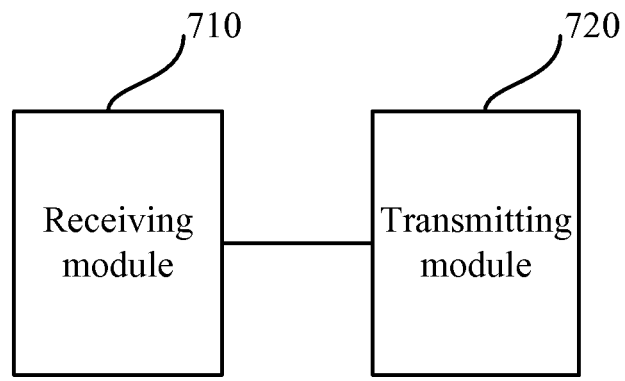
FIG. 7 is a structure diagram of a user equipment in embodiment 7 of the present invention.

FIG. 7 is a structure diagram of a user equipment in embodiment 7 of the present invention, comprising:

Receiving module 710, is used for receiving the special SRS sequence information for CoMP from a base station equipment, said base station equipment corresponding to cells in a CoMP SRS cluster.

Transmitting module 720, is used for transmitting an SRS to the cells in the CoMP SRS cluster according to the special SRS sequence information received by the receiving module 710.

The above-mentioned receiving module 710, is specifically used for receiving said special SRS sequence information for CoMP according to any one of the following manners:

RRC signaling, downlink control signaling and broadcast notification.

The above-mentioned special SRS sequence information for CoMP comprising cyclic shift value, and sequence group number and base sequence number corresponding to CoMP SRS base sequence. The above-mentioned transmitting module 720, is specifically used for determining corresponding CoMP SRS base sequence according to said sequence group number and base sequence number, and using said base sequence, said cyclic shift value and SRS configuration information to transmit SRS.

The above-mentioned special SRS sequence information for CoMP comprising cyclic shift value and CoMP SRS base sequence. The above-mentioned transmitting module 720, is specifically used for using said base sequence, said cyclic shift value and SRS configuration information to transmit SRS.

The above-mentioned special SRS sequence information for CoMP comprising cyclic shift value and the number of CoMP SRS base sequence in base sequence cluster. The above-mentioned transmitting module 720, is specifically used for determining corresponding CoMP SRS base sequence according to the number of CoMP SRS base sequence in the base sequence cluster, and using said base sequence, said cyclic shift value and SRS configuration information to transmit SRS.

The above-mentioned special SRS sequence information for CoMP comprising cyclic shift value and group ID of CoMP SRS cluster. The above-mentioned transmitting module 720, is specifically used for determining corresponding CoMP SRS base sequence according to said group ID, and using said base sequence, said cyclic shift value and SRS configuration information to transmit SRS.

The above-mentioned special SRS sequence information for CoMP comprising cyclic shift value and the number of group ID of CoMP SRS cluster. The above-mentioned transmitting module 720, is specifically used for obtaining corresponding CoMP SRS base sequence according to the number of group ID, and using said base sequence, said cyclic shift value and SRS configuration information to transmit SRS.

The above-mentioned special SRS sequence information for CoMP comprising cyclic shift value, group ID and sequence ID of CoMP SRS cluster. The above-mentioned transmitting module 720, is specifically used for determining corresponding CoMP SRS base sequence according to said group ID and sequence ID, and using said base sequence, said cyclic shift value and SRS configuration information to transmit SRS.

The above-mentioned special SRS sequence information for CoMP comprising cyclic shift value, group ID and sequence ID number of CoMP SRS cluster. The above-mentioned transmitting module 720, is specifically used for determining corresponding CoMP SRS base sequence according to said group ID and sequence ID number, and using said base sequence, said cyclic shift value and SRS configuration information to transmit SRS.

For the following SRS transmission, the above-mentioned transmitting module 720, is further used for using said special SRS sequence information for CoMP to transmit SRS, or reconfiguring special SRS sequence information for CoMP, or implementing sequence hopping according to specific predefined hopping manner of SRS.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 8:
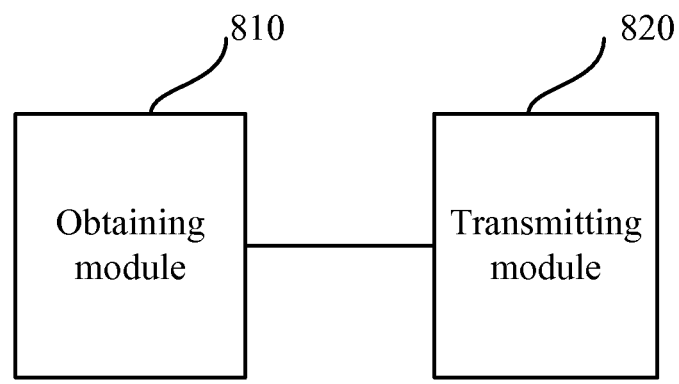
FIG. 8 is a structure diagram of a base station equipment in embodiment 8 of the present invention.

FIG. 8 is a structure diagram of a base station equipment in embodiment 8 of the present invention, comprising:

Obtaining module 810, is used for obtaining the special SRS sequence information for CoMP corresponding to cells in a CoMP SRS cluster.

Transmitting module 820, is used for transmitting the special SRS sequence information for CoMP obtained by said obtaining module to user equipment, to let said user equipment transmit SRS according to said special SRS sequence information for CoMP.

The above-mentioned transmitting module 820, is specifically used for transmitting said special SRS sequence information for CoMP to said user equipment according to any one of the following manners:

RRC signaling, downlink control signaling and broadcast notification.

The above-mentioned special SRS sequence information for CoMP comprising cyclic shift value, and sequence group number and base sequence number corresponding to CoMP SRS base sequence. The above-mentioned obtaining module 810, is specifically used for choosing CoMP SRS base sequence, and determining sequence group number and base sequence number which can resolve said base sequence.

The above-mentioned special SRS sequence information for CoMP comprising cyclic shift value and CoMP SRS base sequence. The above-mentioned obtaining module 810, is specifically used for choosing CoMP SRS base sequence.

The above-mentioned special SRS sequence information for CoMP comprising cyclic shift value and the number of CoMP SRS base sequence in base sequence cluster. The above-mentioned obtaining module 810, is specifically used for choosing CoMP SRS base sequence, assembling said chosen CoMP SRS base sequence into a base sequence cluster, and numbering the CoMP SRS base sequence in said base sequence cluster.

The above-mentioned special SRS sequence information for CoMP comprising cyclic shift value and group ID of CoMP SRS cluster. The above-mentioned obtaining module 810, is specifically used for choosing CoMP SRS base sequence, determining group ID which can resolve said base sequence.

The above-mentioned special SRS sequence information for CoMP comprising cyclic shift value and the number of group ID of CoMP SRS cluster. The above-mentioned obtaining module 810, is specifically used for choosing CoMP SRS base sequence, assembling the available group IDs which can resolve base sequences into a cluster, and numbering each group ID in said cluster.

The above-mentioned special SRS sequence information for CoMP comprising cyclic shift value, group ID and sequence ID of CoMP SRS cluster. The above-mentioned obtaining module 810, is specifically used for choosing CoMP SRS base sequence, and determining said group ID and the sequence ID.

The above-mentioned special SRS sequence information for CoMP comprising cyclic shift value, group ID and sequence ID number of CoMP SRS cluster. The above-mentioned obtaining module 810, is specifically used for choosing CoMP SRS base sequence, and determining said group ID and the sequence ID number.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Figure 9:
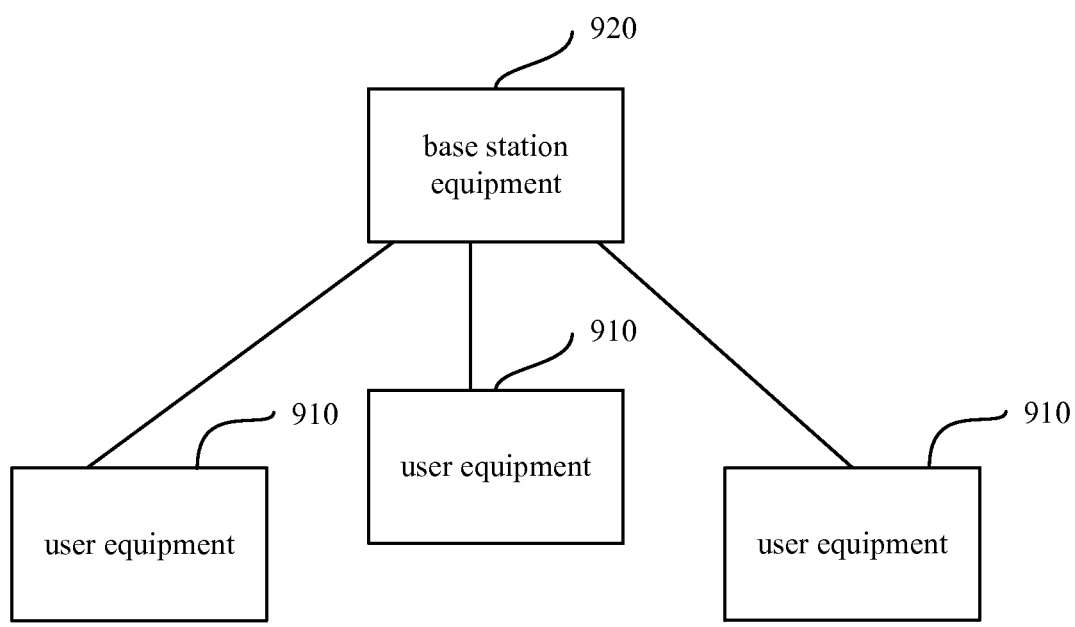
FIG. 9 is a structure diagram of a system for transmitting SRS in embodiment 9 of the present invention.

FIG. 9 is a structure diagram of a system for transmitting SRS in embodiment 9 of the present invention, comprising user equipment 910 and base station equipment 920, wherein:

The user equipment 910, is used for receiving the special SRS sequence information for CoMP from said base station equipment 920, transmitting an SRS to the cells in the CoMP SRS cluster according to said special SRS sequence information, said base station equipment 920 corresponds to cells in a CoMP SRS cluster.

The base station equipment 920, is used for obtaining the special SRS sequence information for CoMP corresponding to cells in a CoMP SRS cluster, transmitting the special SRS sequence information for CoMP to said user equipment 910, to let said user equipment 910 transmit SRS according to said special SRS sequence information for CoMP.

Technical solution of the embodiment of the present invention has the following advantages: the solution provides SRS base sequence notification manner and sequence notification form based on CoMP technique. In the solution, sequence information is notified to UEs, particularly in case that the CoMP SRS base sequences used in cells in CoMP SRS cluster are not bound to cell IDs, that reduces interference among CoMP SRS resources of cells, and SRS interference between CoMP and non-CoMP SRS resources, and ensures the accuracy of channel estimation.

Through the description of the embodiments above, the technical personnel in this field can understand clearly that the present invention can be implemented by software and necessary current hardware platform. Of course, it also can be implemented by hardware, but in many situations the former is the better. Based on this understanding, essence or section with contribution to existing technology of the technical program of the present invention can be embodied by a form of software product which can be stored in a storage medium, including a number of instructions for making a computer device (such as mobile phone, personal computers, servers, or network equipments, etc.) to implement the methods described in the embodiments of the present invention.

The descriptions above are just preferred implement ways of the present invention. It should be pointed out that, for general technical personnel in this field, some improvement and refinement can be done, which should be as the protection scope of the present invention. Serial numbers of the above-mentioned embodiments of the present invention are only used for description, which does not imply whether the embodiment is excellent or poor.

The technical personnel in this field can understand that the modules of the devices in the embodiments can be set in the devices according to the description of the embodiments, also can be set in one or more devices different from the embodiments. Modules in the above-mentioned embodiments can be integrated into one entirety, and also can be deployed separately, can be combined into one module, and also can be further split into multiple sub-modules.

The invention claimed is:

1. A method for transmitting sounding reference signals (SRS), comprising:
   a user equipment receiving special SRS sequence information for Coordinated Multi-Point Operation (CoMP) from a base station equipment, the base station equipment corresponding to cells in a CoMP SRS cluster;
   the user equipment transmitting an SRS to the cells in the CoMP SRS cluster according to the special SRS sequence information
   wherein the special SRS sequence information for CoMP comprising cyclic shift value, and sequence group number and base sequence number corresponding to CoMP SRS base sequence;
   the step of the user equipment transmitting an SRS to the cells in the CoMP SRS cluster according to the special SRS sequence information comprising:
   the user equipment determining corresponding CoMP SRS base sequence according to the sequence group number and base sequence number, and using the base sequence, the cyclic shift value and SRS configuration information to transmit SRS.

2. The method according to claim 1, wherein the special SRS sequence information for CoMP is bound to SRS sequence of one cell in the CoMP SRS cluster, or bound to none of SRS sequences of any cell in the CoMP SRS cluster.

3. The method according to claim 2, wherein the cyclic shift value is from cluster same as or different from that used in an existing LTE system, setting different cyclic shift value clusters in different CoMP SRS clusters according to the requirement.

4. The method according to claim 1, wherein the special SRS sequence information for CoMP comprising cyclic shift value and CoMP SRS base sequence, and the user equipment using the base sequence, the cyclic shift value and SRS configuration information to transmit SRS.

5. The method according to claim 4, wherein after the user equipment transmitting an SRS to the cells in the CoMP SRS cluster according to the special SRS sequence information, further comprising:
for the following SRS transmission, the user equipment using the special SRS sequence information for CoMP to transmit SRS, or reconfiguring special SRS sequence information for CoMP, or implementing sequence hopping according to specific predefined hopping manner of SRS.

6. The method according to claim 1, wherein the special SRS sequence information for CoMP comprising cyclic shift value and the number of CoMP SRS base sequence in base sequence cluster;
before the user equipment receiving the special SRS sequence information for CoMP from the base station equipment, the method further comprising:
the base station equipment choosing CoMP SRS base sequences, assembling the chosen CoMP SRS base sequences into a base sequence cluster, and numbering CoMP SRS base sequences in the base sequence cluster;
the step of the user equipment transmitting an SRS to the cells in the CoMP SRS cluster according to the special SRS sequence information is comprising:
the user equipment determining corresponding CoMP SRS base sequence according to the number of CoMP SRS base sequence in the base sequence cluster, and using the base sequence, the cyclic shift value and SRS configuration information to transmit SRS.

7. The method according to claim 6, wherein after the user equipment transmitting an SRS to the cells in the CoMP SRS cluster according to the special SRS sequence information, the method further comprising:
for the following SRS transmission, the user equipment using the special SRS sequence information for CoMP to transmit SRS, or reconfiguring special SRS sequence information for CoMP, or implementing sequence hopping according to specific predefined hopping manner of SRS.

8. The method according to claim 1, wherein the special SRS sequence information for CoMP comprising cyclic shift value and group ID of CoMP SRS cluster;
before the user equipment receiving the special SRS sequence information for CoMP from the base station equipment, the method further comprising:
the base station equipment choosing CoMP SRS base sequence, and determining the group ID which can resolve the base sequence;
the step of the user equipment transmitting an SRS to the cells in the CoMP SRS cluster according to the special SRS sequence information comprising:
the user equipment determining corresponding CoMP SRS base sequence according to the group ID, and using the base sequence, the cyclic shift value and SRS configuration information to transmit SRS.

9. The method according to claim 1, wherein the special SRS sequence information for CoMP comprising cyclic shift value and the number of group ID of CoMP SRS cluster;
before the user equipment receiving the special SRS sequence information for CoMP from the base station equipment, the method further comprising:
the base station equipment choosing CoMP SRS base sequence, assembling the available group IDs which can resolve base sequences into a cluster, and numbering each group ID in the cluster;
the step of the user equipment transmitting an SRS to the cells in the CoMP SRS cluster according to the special SRS sequence information comprising:
the user equipment obtaining corresponding CoMP SRS base sequence according to the number of group ID, and using the base sequence, the cyclic shift value and SRS configuration information to transmit SRS.

10. The method according to claim 1, wherein the special SRS sequence information for CoMP comprising cyclic shift value, group ID and sequence ID of CoMP SRS cluster;
before the user equipment receiving the special SRS sequence information for CoMP from the base station equipment, the method further comprising:
the base station equipment choosing CoMP SRS base sequence, and determining the group ID and the sequence ID;
the step of the user equipment transmitting an SRS to the cells in the CoMP SRS cluster according to the special SRS sequence information for CoMP comprising:
the user equipment determining corresponding CoMP SRS base sequence according to the group ID and sequence ID, and using the base sequence, the cyclic shift value and SRS configuration information to transmit SRS.

11. The method according to claim 1, wherein the user equipment receiving special SRS sequence information for CoMP from the base station equipment, specifically comprising:
the user equipment receiving the special SRS sequence information for CoMP according to any one of the following manners:
radio resource control (RRC) signaling, downlink control signaling and broadcast notification.

12. A user equipment, wherein comprising:
a receiving module, configured to receive special SRS sequence information for Coordinated Multi-Point Operation (CoMP) from a base station equipment, the base station equipment corresponding to cells in a CoMP SRS cluster;
a transmitting module, configured to transmit an SRS to the cells in the CoMP SRS cluster according to the special SRS sequence information received by the receiving module
wherein the special SRS sequence information for CoMP comprising cyclic shift value, and sequence group number and base sequence number corresponding to CoMP SRS base sequence;
the transmitting module, is specifically configured to determine corresponding CoMP SRS base sequence according to the sequence group number and base sequence number, and use the base sequence, the cyclic shift value and SRS configuration information to transmit SRS.

13. The user equipment according to claim 12, wherein the receiving module, is specifically configured to receive the special SRS sequence information for CoMP according to any one of the following manners:

radio resource control (RRC) signaling, downlink control signaling and broadcast notification.

14. The user equipment according to claim 12, wherein the special SRS sequence information for CoMP comprising cyclic shift value and CoMP SRS base sequence;
the transmitting module, is specifically used for using the base sequence, the cyclic shift value and SRS configuration information to transmit SRS.

15. The user equipment according to claim 12, wherein the special SRS sequence information for CoMP comprising cyclic shift value and the number of CoMP SRS base sequence in base sequence cluster;
the transmitting module, is specifically configured to determine corresponding CoMP SRS base sequence according to the number of CoMP SRS base sequence in the base sequence cluster, and use the base sequence, the cyclic shift value and SRS configuration information to transmit SRS.

16. The user equipment according to claim 12, wherein the special SRS sequence information for CoMP comprising cyclic shift value and group ID of CoMP SRS cluster;
the transmitting module, is specifically configured to determine corresponding CoMP SRS base sequence according to the group ID, and use the base sequence, the cyclic shift value and SRS configuration information to transmit SRS.

17. The user equipment according to claim 12, wherein the special SRS sequence information for CoMP comprising cyclic shift value and the number of group of CoMP SRS cluster;
the transmitting module, is specifically configured to obtain corresponding CoMP SRS base sequence according to the number of group ID, and use the base sequence, the cyclic shift value and SRS configuration information to transmit SRS.

18. The user equipment according to claim 12, wherein the special SRS sequence information for CoMP comprising cyclic shift value, group ID and sequence ID of CoMP SRS cluster;
the transmitting module, is specifically configured to determine corresponding CoMP SRS base sequence according to the group ID and sequence ID, and use the base sequence, the cyclic shift value and SRS configuration information to transmit SRS.

19. The user equipment according to claim 14 or 15, wherein
for the following SRS transmission, the transmitting module, is further configured to use the special SRS sequence information for CoMP to transmit SRS, or reconfigure special SRS sequence information for CoMP, or implement sequence hopping according to specific predefined hopping manner of SRS.

20. A base station equipment, comprising:
an obtaining module, configured to obtain special SRS sequence information for CoMP corresponding to cells in a CoMP SRS cluster;
a transmitting module, configured to transmit the special SRS sequence information for CoMP obtained by the obtaining module to user equipment, so that the user equipment transmits SRS according to the special SRS sequence information for CoMP
wherein the special SRS sequence information CoMP comprising cyclic shift value, and sequence group number and base sequence number corresponding to CoMP SRS base sequence;

the obtaining module, is specifically configured to choose CoMP SRS base sequence, and determine sequence group number and base sequence number which can resolve the base sequence.

21. The base station equipment according to claim 20, wherein
the transmitting module, is specifically configured to transmit the special SRS sequence information for CoMP to the user equipment according to any one of the following manners:
RRC signaling, downlink control signaling and broadcast notification.

22. The base station equipment according to claim 20, wherein the special SRS sequence information for CoMP comprising cyclic shift value and CoMP SRS base sequence;
the obtaining module, is specifically configured to choose CoMP SRS base sequence.

23. The base station equipment according to claim 20, wherein the special SRS sequence information for CoMP comprising cyclic shift value and the number of CoMP SRS base sequence in base sequence cluster;
the obtaining module, is specifically configured to choose CoMP SRS base sequence, assemble the chosen CoMP SRS base sequence into a base sequence cluster, and number the CoMP SRS base sequence in the base sequence cluster.

24. The base station equipment according to claim 20, wherein the special SRS sequence information for CoMP comprising cyclic shift value and group ID of CoMP SRS cluster;
the obtaining module, is specifically configured to choose CoMP SRS base sequence, and determine group ID which can resolve the base sequence.

25. The base station equipment according to claim 20, wherein the special SRS sequence information for CoMP comprising cyclic shift value and the number of group ID of CoMP SRS cluster;
the obtaining module, is specifically configured to choose CoMP SRS base sequence, assemble the available group IDs which can resolve base sequences into a cluster, and number each group ID in the cluster.

26. The base station equipment according to claim 20, wherein the special SRS sequence information for CoMP comprising cyclic shift value, group ID and sequence ID of CoMP SRS cluster;
the obtaining module, is specifically configured to choose CoMP SRS base sequence, and determine the group ID and the sequence ID.

27. A system for transmitting SRS, comprising user equipment and base station equipment, wherein
the user equipment, configured to receive special SRS sequence information for CoMP from the base station equipment, transmit an SRS to the cells in the CoMP SRS cluster according to the special SRS sequence information, the base station equipment corresponding to cells in a CoMP SRS cluster;
the base station equipment, is configured to obtain the special SRS sequence information for CoMP corresponding to cells in a CoMP SRS cluster, transmit the special SRS sequence information for CoMP to the user equipment, so that the user equipment transmits SRS according to the special SRS sequence information for CoMP.

* * * * *